United States Patent [19]

Noddings et al.

[11] 4,336,566
[45] Jun. 22, 1982

[54] VEHICLE SPEED CONTROL SYSTEMS

[75] Inventors: John Noddings, Coventry; Roland K. Borton, Rugby, both of England

[73] Assignee: Associated Engineering Limited, Leamington Spa, England

[21] Appl. No.: 171,973

[22] Filed: Jul. 24, 1980

[30] Foreign Application Priority Data

Aug. 3, 1979 [GB] United Kingdom ................. 7927128

[51] Int. Cl.³ .............................................. B60K 31/00
[52] U.S. Cl. .................................... 361/242; 361/236; 361/239; 180/178
[58] Field of Search ............... 361/239, 242, 236, 238; 180/178

[56] References Cited

U.S. PATENT DOCUMENTS 3,570,622  3/1971  Wisner ................................. 361/247
3,757,130  9/1973  Uchiyama et al. ................... 361/239
3,952,829  4/1976  Gray .................................... 361/239
4,196,466  4/1980  Noddings et al. ................... 361/239
4,286,306  8/1981  Kraus et al. .......................... 361/242

Primary Examiner—J. D. Miller
Assistant Examiner—L. C. Schroeder
Attorney, Agent, or Firm—Leydig, Voit, Osann, Mayer & Holt, Ltd.

[57] ABSTRACT

A vehicle speed system is described in which an electrical signal representing actual vehicle speed is compared with a stored signal representing desired vehicle speed. Any speed error is used in a servo loop to generate a control signal which tends to reduce the error to zero. In addition, signals representing the actual and desired vehicle speeds are compared in a comparator unit so as to produce a disabling signal when the actual vehicle speed either exceeds the desired speed by more than a predetermined amount, or falls below the desired speed by more than a predetermined amount, (e.g. because road conditions prevent the vehicle engine from driving the vehicle at or close to the desired speed). This enabling signal is used to switch the control system out of operation.

16 Claims, 3 Drawing Figures

VEHICLE SPEED CONTROL SYSTEMS

BACKGROUND OF THE INVENTION

The invention relates to speed responsive systems and more particularly to speed responsive systems for vehicles whereby the vehicle may be kept at or about a predetermined speed.

BRIEF SUMMARY OF THE INVENTION

According to the invention, there is provided a vehicle speed control system arranged when rendered operative to control the engine of the vehicle so as to tend to hold the vehicle to run at a desired speed, and disabling means responsive to the speed of the vehicle and the desired speed to render the system inoperative when the vehicle speed diverges from the desired speed by more than a predetermined amount.

According to the invention, there is also provided a vehicle speed control system, comprising storage means for storing a first electrical signal representing a desired speed for the vehicle, means for producing a second electrical signal dependent on the actual speed of the vehicle, means for comparing the first and second electrical signals to produce a control signal dependent on the magnitude and sign of the difference between the actual and desired vehicle speeds, speed correcting means operative in response to the control signal to change the speed of the engine of the vehicle by an amount and in a direction tending to reduce the said difference to zero, and disabling means connected to disable the speed correcting means when the said difference falls outside predetermined positive and negative limits, so as to enable the vehicle speed to be thereafter manually controlled by the driver.

DESCRIPTION OF THE DRAWINGS

Vehicle speed control systems embodying the invention will now be described with reference to the accompanying drawings in which.

DESCRIPTION OF PREFERRED EMBODIMENTS

The systems to be described are for automatically controlling a motor vehicle to run at a predetermined speed which is set by the driver. Once the speed has been selected and set by the driver, the system operates automatically to hold the vehicle at that speed, subject, of course, to the speed being within the capability of the vehicle having regard to the gradient and other factors. In the systems to be described, if the speed required becomes outside the capability of the vehicle, the system is automatically switched off, whereafter control of the vehicle speed is resumed by the driver.

Figure 1:
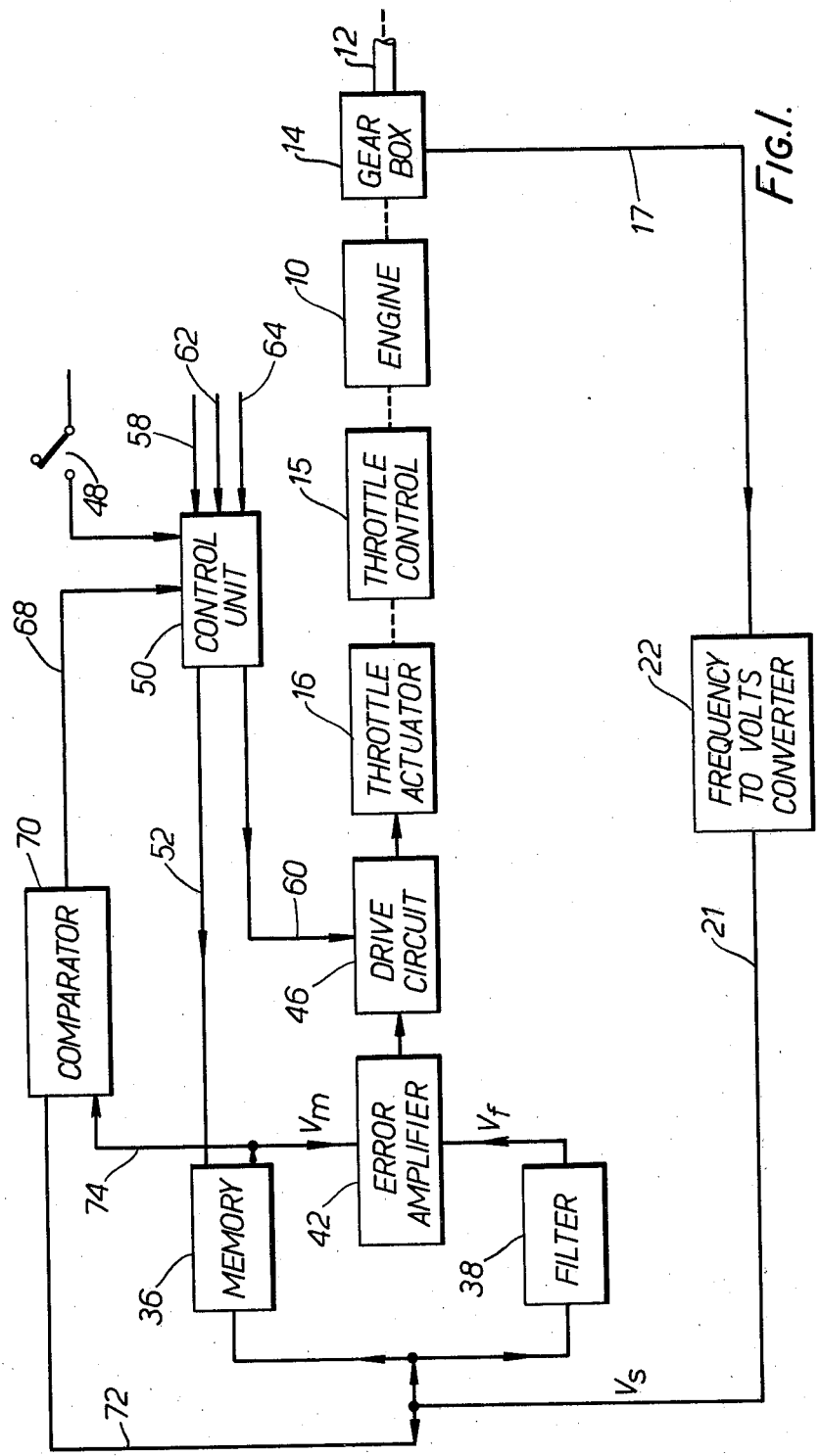
FIG. 1 is a block circuit diagram of the system.

FIG. 1 shows the engine 10 of the motor vehicle driving the propellor shaft 12 through a gearbox 14, the speed of the engine being regulated by means of a throttle control 15. The control 15 will normally form a part of the engine carburetter and is arranged to be adjustable by the driver's throttle pedal in the usual way. In addition, however, it is connected to be adjustable by means of a throttle actuator 16.

It will be appreciated that in relation to the application of the system to a diesel-engine-powered vehicle, the throttle control 15 would be replaced by the equivalent engine power control device.

A line 17 carries a pulsating electrical signal whose frequency is dependent on the road speed of the vehicle. This signal is derived in a road speed transducer which may be of any suitable type. For example, it can comprise an electromagnetic transducer sensing the rotational speed of the propeller shaft of the vehicle. However, various other means can be used for producing an electrical signal dependent on the road speed of the vehicle.

The speed dependent signal on line 17 is then passed to a frequency-to-voltage converter 22 which produces an output voltage Vs on a line 21 dependent on engine speed. The system may be arranged so that either the signal Vs is proportional to engine speed or inversely proportional to engine speed.

The circuit 22 may take any suitable form. It may, for example, comprise a limiting amplifier and monostable circuit for converting the pulse signal on line 17 into a rectangular wave of constant amplitude and width, followed by a smoothing circuit.

The speed-dependent signal Vs is then fed to a memory 36 and is also fed directly to a filter 38. The memory 36 and the filter 38 produce respective outputs Vm and Vf which are both fed to an error amplifier 42. The latter drives a drive circuit 46 which in turn drives the throttle actuator 16.

The operation of the system as so far described is as follows.

When the driver wishes to bring the system into operation to control the vehicle to run at a particular speed, he accelerates the vehicle up to that speed (or decelerates it down to that speed) and momentarily closes a switch 48 when the vehicle is running at the desired speed. This momentary closure of switch 48 causes a control unit 50 to activate memory 30 by means of a line 52 and feeds into the memory 36 a signal dependent on that vehicle speed. This signal becomes stored in the memory 36 when the switch 48 is once more open, and is fed as the signal Vm to one input of the error amplifier 42. The other input of the amplifier 42 receives the signal Vf from the filter 38.

The relationship between the signal Vf and the signal Vs depends on the characteristic of the filter. In this embodiment, Vf is affected by the rate of change of Vs so as to tend to change by a greater amount when Vs is changing rapidly than when Vs is changing slowly, and therefore leads on Vs when the vehicle speed is changing rapidly, in either sense.

For so long as the vehicle remains at the desired speed, the two inputs to the error amplifier 42 will be equal and the throttle actuator 16 will hold the throttle control unchanged. If the vehicle tends to change speed from the desired setting, however, there will be a resultant change in engine speed and Vf will change. The error amplifier 42 will produce a corresponding output which will energise the drive circuit 46 in such a direction as to cause the throttle actuator 16 to adjust the position of the throttle control 15 so as to tend to bring the vehicle back to the desired speed.

The system as so far described may for example take the form disclosed in our co-pending patent application No. 10134/76 (Ser. No. 1570887).

The control unit 50 checks the various operating parameters of the vehicle to determine whether the system can be brought into operation (in response to operation of the switch 48 by the driver) or, if the system is already in operation, whether it should be automatically switched off. The control unit 50 has several input lines by which it receives signals dependent on various operating parameters of the vehicle. For example, the unit has an input line 58 which senses when the vehicle's brakes are applied (as by sensing for electrical conditions in the vehicle brake lamp circuit). When the signal on line 58 indicates that the driver has applied the vehicle brakes, the unit 58 produces a disabling signal on a line 60 which deactivates the drive circuit 46 so as to disable the system. Other input lines to the unit 56, for example the input lines 62 and 64, carry signals representing other operating parameters of the vehicle. For example, one of these lines may carry a signal when the driver disengages the vehicle clutch, and another may carry a signal when the driver puts the vehicle's gearbox into neutral, and in either of these cases, the unit 50 would energise line 60 to disable the system.

The foregoing illustrate some of the vehicle operating parameters to which the unit 50 may respond.

The unit 50 may also be arranged to check the vehicle operating parameters before the speed control system is engaged by the driver. If the unit 50 determines that the operating parameters are in a satisfactory condition when the driver operates the switch to engage the system, then, by means of the line 52, it sets the memory 36 into condition for storing a desired speed signal in the manner explained above, and of course enables the system by means of an appropriate signal on the line 60. The control unit 50 may be arranged so that, once the system is in operation, the unit only disables the drive circuit 46 (by means of line 60) in response to occurrence of the appropriate signal on one of its input lines 58, 62, 64, but does not clear the memory 36. Therefore, the previously-stored signal in memory 36, representing desired speed, remains stored, and the driver may manually re-engage the system (provided that the condition of the vehicle parameter which caused the control unit 50 to disable the system has now been removed), and the system will then bring the vehicle speed up to the desired value represented by the stored signal. Other input signals to the control unit 50 may, however, be arranged to cause the unit 50 not only to disable the system, but also to clear the memory 36 by means of the line 52.

As shown, the control unit 50 also has a further input line 68 from a comparator unit 70. The comparator unit 70 has a first input line 72 which is fed from the line 21 and carries the signal Vs. The second input line 74 to the comparator unit 70 carries the signal Vm from the memory 36. The comparator unit 70 compares Vs and Vm to determine the speed error at any time. In a manner to be explained in more detail with reference to FIGS. 2 and 3, the comparator determines whether this speed error falls outside upper and lower limits and, if so, produces a signal on line 68 which causes the control unit 50 to disable the system via line 60.

For example, the limits applied by the comparator unit 70 to the speed error could be plus and minus 15 kilometers per hour. In other words, if the actual vehicle speed (represented by Vs) exceeds the desired vehicle speed (represented by Vm) by at least 15 kilometers per hour, or falls below the desired vehicle speed by at least 15 kilometers per hour, the system is disabled by the control unit 50.

In this way, the system is disabled when the vehicle engine is not able to maintain the actual vehicle speed at or close to the desired vehicle speed, for example due to abnormal gradients or loss of engine power. The system is also disabled if for any other reason the speed becomes too high in relation to the desired speed.

Figure 2:
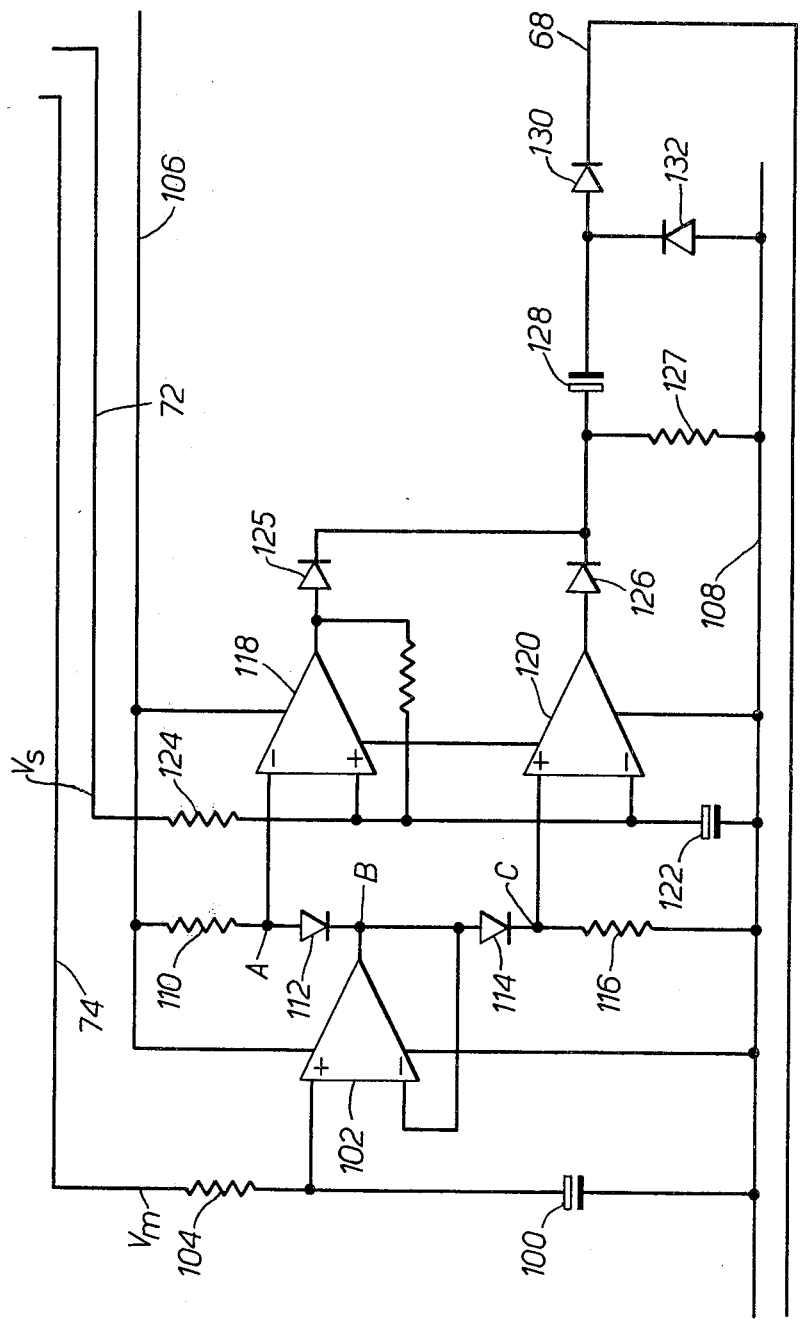
FIG. 2 is a more detailed circuit diagram of part of the system.

FIG. 2 shows one form which the circuit of the comparator unit 70 can take.

As shown in FIG. 2, the signal Vm on line 74 is applied, across a smoothing capacitor 100, to the input of a buffer 102 via a resistor 104. The output Vm is applied to a potential divider connected between circuit supply lines 106 and 108, the potential divider comprising a resistor 110, a diode 112, another diode 114, and a resistor 116. The voltage applied across the supply lines 106 and 108 is stabilised, and the diodes 112 and 114 are therefore biased to fixed points on their operating characteristics. Therefore, the voltage at point A exceeds the voltage at B by a fixed amount, while the voltage at point C is less than the voltage at B by the same fixed amount. Therefore, if point B is at a voltage Vm, then point A is at a voltage (Vm+$\delta$V) and the voltage at point C is (Vm−$\delta$V).

Points A and C are each connected to the input of a respective one of two comparators 118 and 120. The second inputs of these comparators are fed, across a capacitor 122, with the signal Vs via the line 72 and a resistor 124.

Each comparator 118, 120 therefore compares the voltage at the point A or C with the voltage Vs. If the voltage Vs falls below (Vm−$\delta$V) at point C, comparator 120 changes state and drives a current through an output diode 126. Similarly, if the voltage Vs rises above the voltage (Vm+$\delta$V) at point A, then comparator 118 changes state and drives an output current through an output diode 125. Diodes 125 and 126 are connected to form an OR gate, and when current is driven through either of them, in response to one or other of the comparators 118 and 120 changing state, this current flows through a resistor 127 and produces a pulse through a capacitor 128. This pulse passes through a diode 130 to the line 68 so as to cause the control unit 50 (FIG. 1) to disable the system.

When the particular comparator 118 or 120 which had changed state resumes its quiescent state (when the vehicle speed comes within limits again) a diode 132 clips the resultant negative pulse passing through the capacitor 128.

Instead of the diodes 112 and 114, resistors may be used, so that, in that case, the limits ±$\delta$V will not be constant but will be variable.

Figure 3:
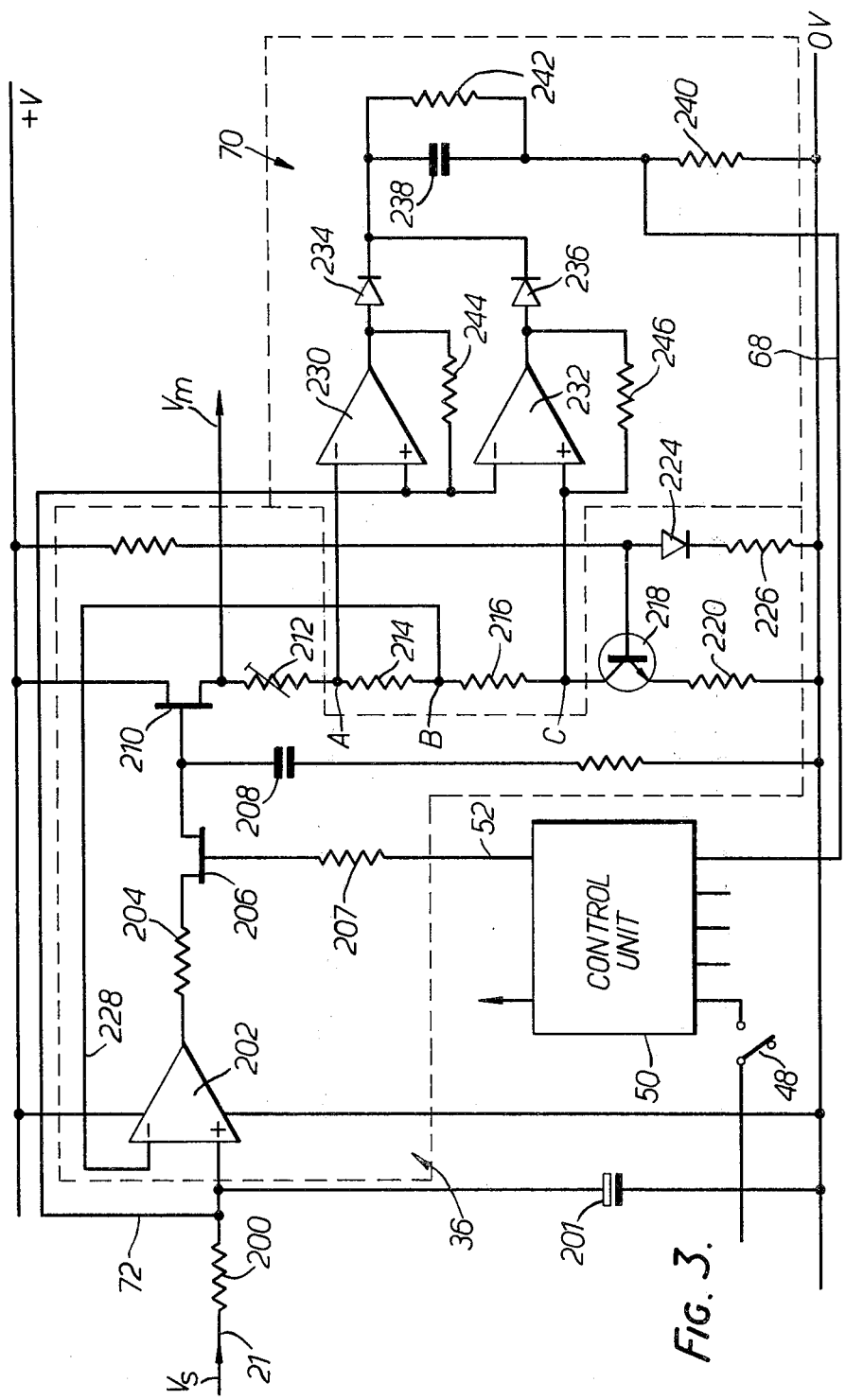
FIG. 3 corresponds to FIG. 2 but shows a different form which that part of the circuit may take.

FIG. 3 shows another form which the circuit of the comparator unit 70 can take. In fact, FIG. 3 also includes the circuit of the memory 36 and shows the control unit 50.

As shown in FIG. 3, the speed signal Vs on line 21 is applied to the memory 36 through a resistor 200 and is fed to the non-inverting input of an operational amplifier 202. Resistor 200 acts in conjunction with a capacitor 201 to filter out ripple from Vs. The amplifier output is fed through a resistor 204 and a field effect transistor 206 to one plate of a capacitor 208 which forms the storage unit of the memory 36 as will be explained in detail. The capacitor controls the potential applied to the gate electrode of a further field effect transistor 210.

The field effect transistor 210 has its source circuit supplied with a substantially constant current through a circuit comprising an adjustable resistor 212, fixed resistors 214 and 216, the collector-emitter path of an npn transistor 218 and a resistor 220. The conduction of transistor 218 is controlled by a potential divider circuit comprising a resistor 222 in series with a diode 224 and another resistor 226.

A feedback line 228 connects the junction of resistors 214 and 216 to the inverting input of the operational amplifier 202.

The conduction of transistor 218 is pre-set so that the current through the FET 210 is at a value at which the gate-source voltage of the FET is least sensitive to changes in ambient temperature. Such temperature changes will themselves effect the conduction of transistor 218, but this is offset by the effect which they have on the current through the diode 224. The result is, therefore, that the FET 210 is substantially unaffected by ambient temperature changes.

The comparator unit 70 includes two comparators 230 and 232. The inverting input of comparator 230 is connected to the junction between resistors 212 and 214 (point A), and the non-inverting input of comparator 232 is connected to the junction between resistor 216 and transistor 218 (point C). The other inputs of the comparators 230 and 232 are connected together to receive the signal Vs on the line 72 (see FIG. 1). The outputs of the comparators 230 and 232 are connected together through diodes 234 and 236 and feed a resistor 240 via a capacitor 238 with a resistor 242 in parallel. The voltage developed across resistor 240 is fed to the control unit 50 on the line 68 (see also FIG. 1).

In FIG. 3, the line 74 of FIG. 1, which feeds the signal dependent on the desired vehicle speed to the comparator unit 70, can be considered to the line feeding the resistors 214 and 216 from the FET 210.

The operation of the circuit of FIG. 3 will now be described.

When the driver wishes to bring the speed control system into operation, he momentarily closes switch 48 which causes the control unit 50 to energise line 52 so as to render FET 206 conductive. The operational amplifier 202 is now connected in a closed loop through the conducting FET 206, the gate and source of FET 210, the resistors 212 and 214, the point B and the feedback line 228. The amplifier 202 therefore operates to make the voltage at its inverting input virtually the same as at the non-inverting input, thus making the voltage at point B substantially equal to the value of Vs at that time. In addition, capacitor 208 becomes charged to the voltage present at the gate of FET 210.

The driver only momentarily operates switch 48, and when he releases it FET 206 is rendered non-conductive by the control unit 50 and the charge on capacitor 208 is thus held at the immediately preceding value. This value is of course a value such that the voltage at the point B represents the speed at which the vehicle is required to travel.

In the comparator unit 70, the constant current flowing through resistors 214 and 216 has the effect that the voltage at point A exceeds the voltage at point B by a fixed amount ($\delta V$) while the voltage at point C is less than the voltage at point B by the same fixed amount ($\delta V$). Each comparator 230 and 232 therefore compares the actual value of the voltage Vs, received via line 72 and which will vary as the speed of the vehicle varies, with the voltage applied to its other input which will represent a limit ($+\delta V$ or $-\delta V$) above or below the voltage at point B and thus above or below the signal stored in the memory 36.

The voltages at point A and C thus represent the limits applied by the comparator unit 70 to the maximum speed error.

If the vehicle speed diverges from the desired value by more than a predetermined amount, represented by these limits, one or other of the comparators 230 and 232 will be activated, depending on the direction of the speed error, and will drive a current through its output diode 234 or 236. The resultant current will charge capacitor 238 which will produce a pulse across resistor 240 and thus generate a signal on line 68 which will disable the speed control system via the control unit 50 and the line 60 (FIG. 1).

If and when the vehicle speed changes so that the speed error is reduced and now falls within the limits set by the voltages at points A and C, the previously activated comparator 230 or 232 will resume its quiescent state. When this happens, a respective one of the diodes 234 and 236 will become reverse-biased and capacitor 238 will discharge through resistor 242. The comparator unit 70 is thus reset—though the speed control system will not be brought back into action merely in response to this. In order to bring the speed control system back into operation, it is necessary for the driver to re-activate it. This will cause the control unit 50 to remove the inhibiting signal on line 60 (FIG. 1) so that the drive circuit 46 can once more control the vehicle's speed to the level represented by the signal which is still stored in the capacitor 208.

The vehicle may also be provided with a "resume" control which can be activated by the driver after the comparator unit 70 has produced the disabling signal on line 68. In response to such operation, the control unit 50 again removes the inhibiting signal on line 60 (FIG. 1) so as to allow the drive circuit 46 to take over speed control again. This can be carried out even if the vehicle speed is outside the upper and lower speed limits applied to the comparators 230 and 232: this is because the comparator unit acts by applying a pulse on line 68 and, once such pulse has been produced, the capacitor 238 is held fully charged and the voltage level subsequently maintained across resistor 240 is insufficient to energise line 68.

Resistors 244 and 246 provide a small amount of positive feedback to the non-inverting inputs of the comparators 230 and 232 and ensure that they switch cleanly.

Although the voltage at point B represents the charge stored on the memory capacitor 208, and thus represents the desired speed, the voltage Vm, being the input to the error amplifier 42 (FIG. 1), is not taken directly from point B but from the junction between FET 210 and the variable resistor 212. This enables the resistor 212 to be adjusted on test so as to alter the cruising speed of the vehicle relative to the actual speed signal stored in the memory. This adjustment can be made if the vehicle is found not to cruise exactly at the speed memorised on engagement of the system.

The use of the operational amplifier 202 is advantageous because it makes the voltage at point B substantially the same as the voltage Vs as soon as the system is engaged, and ensures, therefore, that it is not necessary for the field effect transistors from which FET 110 is to be selected to be specially selected or pre-graded according to their gate-source voltage—the operational amplifier 202 compensates for variations between the gate-source voltage of different field effect transistors. The variable resistor 212 does not therefore have to be adjustable to compensate the actual gate-source voltage of the particular field effect transistor used for the FET 210 and can therefore be used merely to adjust the actual cruising speed of the vehicle relative to actual stored speed as explained above.

When the system is engaged, the operational amplifier 202 very rapidly brings the voltage at point B to the value of Vs, and therefore the length of the engaging period does not substantially affect the accuracy of the actual speed signal stored in the memory capacitor 208.

In addition, the operational amplifier 202 isolates the memory capacitor 208 from the filtering capacitor 201, and therefore the action of charging up capacitor 208 does not affect the voltage across capacitor 201 or the actual voltage Vs. This gives a smoother and more accurate engagement of the speed control system.

The circuitry shown in FIG. 3 is advantageous over that shown in FIG. 2 because the potential drops across resistors 214 and 216 (which define the limits applied by the comparator unit 70 above and below the set speed) are dependent only on the constant current. In particular, and unlike the system shown in FIG. 2, the limits are not dependent on the value of speed stored in the memory.

What is claimed is:

1. A vehicle speed control system arranged when rendered operative to control the engine of the vehicle so as to tend to hold the vehicle to run at a desired speed, and disabling means responsive to the speed of the vehicle and the desired speed to render the system inoperative when the actual vehicle speed exceeds the desired speed by more than a predetermined amount and when the actual vehicle speed falls below the desired speed by more than a predetermined amount.

2. A system according to claim 1, in which the two said predetermined amounts are the same.

3. A system according to claim 1 or 2, in which each predetermined amount is constant.

4. A system according to claim 1 or 2, in which each predetermined amount is variable.

5. A system according to claim 4, in which each predetermined amount is variable in dependence on the vehicle speed.

6. A vehicle speed control system, comprising
   storage means for storing a first electrical signal representing a desired speed for the vehicle,
   means for producing a second electrical signal dependent on the actual speed of the vehicle,
   means for comparing the first and second electrical signals to produce a control signal dependent on the magnitude and sign of the difference between the actual and desired vehicle speeds,
   speed correcting means operative in response to the control signal to change the speed of the engine of the vehicle by an amount and in a direction tending to reduce the said difference to zero, and
   disabling means connected to disable the speed correcting means when the said difference falls outside predetermined positive and negative limits, so as to enable the vehicle speed to be thereafter manually controlled by the driver.

7. A system according to claim 6, in which the disabling means comprises
   first and second circuit elements connected together to receive a desired speed signal dependent on the first electrical signal and to generate respective limit signals one of which exceeds the value of the desired speed signal by a predetermined amount and the other of which is less than the desired speed signal by a predetermined amount,
   first and second comparator circuits each connected to compare the value of a respective one of the limit signals with the value of a signal dependent on the second electrical signal,
   whereby the comparator circuits produce disabling signals when the relative values of the two signals which they compare indicate that the vehicle speed has exceeded or has fallen below, respectively, the desired speed by the predetermined amount, and
   means for feeding each disabling signal to disable the speed correcting means.

8. A system according to claim 7, in which the said circuit elements are respective diodes, and the values of the predetermined amounts are constant.

9. A system according to claim 7, in which the circuit elements are respective resistors, and the values of the predetermined amounts are variable.

10. A system according to claim 7, comprising
    respective impedance elements forming the first and second circuit elements and connected together in series,
    constant current means energising the impedance elements with a substantially constant current, and
    means for holding the junction between the impedance elements at a voltage dependent on the desired vehicle speed whereby the voltage difference across one of the circuit elements represents one of the limit signals and the voltage difference across the other of the impedance elements represents the other of the limit signals.

11. A system according to claim 10, in which the circuit elements are respective resistors.

12. A system according to claim 10, in which the storage means comprises
    a capacitor connected to control the voltage on the gate electrode of a field effect transistor having its source circuit connected in series with the first and second circuit elements, and
    means for charging the capacitor to a voltage representing the said first electrical signal.

13. A system according to claim 12, in which the means for charging the capacitor to a voltage representing the first electrical signal comprises
    an operational amplifier connected to receive the second electrical signal at one of its inputs and having its output connected to charge the capacitor through on-off control switch means, and
    a feedback loop connecting the junction between the first and second circuit elements to the other input of the operational amplifier whereby the operational amplifier operates, when the switch means is switched ON while the vehicle is running at an actual speed equal to the desired speed, to bring the voltage at the said junction substantially into equality with the voltage representing the said second electrical signal and the junction is thereafter maintained substantially at that value when the switch means is switched to the OFF state and the voltage representing the first electrical signal has been stored on the said capacitor.

14. A system according to claim 13, including
    a further transistor having its emitter-collector path connected in series with the source circuit of the field effect transistor and the said circuit elements, and means for controlling the base of the further transistor so that the current through the first and second circuit elements is substantially unaffected by the effect of variations in ambient temperature on the said further transistor.

15. A system according to claim 14, in which the means for controlling the base of the transistor includes a diode whose resistance is dependent on the ambient temperature.

16. A system according to claim 10, including an adjustable impedance in series with the first and second circuit elements and in which the means for comparing the first and second electrical signals to produce the said control signal is connected to compare a voltage representing the second electrical signal with a voltage differing from the voltage at the junction between the first and second circuit elements by an amount which is dependent on the adjustment of the variable impedance element and is such as substantially to eliminate offset between the desired vehicle speed and the speed to which the speed correcting means controls the vehicle speed.

* * * * *